United States Patent
Funahashi et al.

(10) Patent No.: US 7,106,608 B2
(45) Date of Patent: Sep. 12, 2006

(54) PRIORITY CIRCUIT

(75) Inventors: Yorimasa Funahashi, Osaka (JP); Yasuyuki Okada, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 240 days.

(21) Appl. No.: 10/936,707

(22) Filed: Sep. 9, 2004

(65) Prior Publication Data

US 2005/0066098 A1   Mar. 24, 2005

(30) Foreign Application Priority Data

Sep. 10, 2003   (JP) ............................. 2003-318924

(51) Int. Cl.
*G11C 15/00* (2006.01)
(52) U.S. Cl. .................................................. 365/49
(58) Field of Classification Search ................. 365/49; 341/160; 710/244
See application file for complete search history.

(56) References Cited

U.S. PATENT DOCUMENTS 5,555,397 A    9/1996  Sasama et al.
6,307,855 B1  10/2001  Hariguchi
6,665,202 B1 * 12/2003  Lindahl et al. ............... 365/49
6,934,172 B1 *  8/2005  Regev et al. .................. 365/49

FOREIGN PATENT DOCUMENTS

JP            60-59595        4/1985

* cited by examiner

*Primary Examiner*—Richard Elms
*Assistant Examiner*—N Nguyen
(74) *Attorney, Agent, or Firm*—McDermott Will & Emery LLP

(57) ABSTRACT

In a priority circuit, priority processing is rapidly performed without lowering the voltage level of a signal propagated through serially connected transistors. When the priority circuit is placed in a non-operational state by turning off an NMOS transistor in accordance with a precharge enable signal, potentials on propagating signal nodes and a HIT output terminal are precharged to H potential by PMOS transistors used for precharging. Therefore, when the NMOS transistor is turned on and the priority circuit enters an operational state, if input signals include a H-level signal, the lowering of the voltage level of a propagated signal is suppressed in increasing the potentials on the propagating signal nodes and the HIT output terminal to the H potential by PMOS transistors used for detecting a HIT signal. Thus, malfunction derived from noise can be prevented.

5 Claims, 10 Drawing Sheets

PRIORITY CIRCUIT

BACKGROUND OF THE INVENTION

The present invention relates to a priority circuit (priority encoding circuit) used for obtaining a binary address output by encoding a plurality of identify address signals of a content addressable memory (CAM) or the like in accordance with predetermined priority levels.

Conventional priority circuits will now be described with reference to drawings.

FIG. 8 shows a conventional priority circuit that receives three input signals IN0, IN1 and IN2 and is operated through control in accordance with clocks C1, C2 and C3 so as to output three binary output signals OUT0, OUT1 and OUT2 as a result of given priority processing of the input signals.

This priority circuit has what is called an active L circuit configuration in which when any of the input signals is at H level, a L-level signal is output to an output terminal HIT, which means that the input signals include a H-level signal, and a H-level signal is output to merely an output terminal corresponding to an input terminal with the highest priority level out of the input terminals having received H-level signals. In this case, the priority level is highest in the lowest portion of the drawing and is lowered toward the upper portion thereof.

In FIG. 8, a reference numeral 800 denotes the priority circuit and a reference numeral 801 denotes a priority circuit element included in the priority circuit 800, and this priority circuit 800 includes three priority circuit elements respectively correspondingly to the three inputs. Reference numerals $802_0$, $802_1$ and $802_2$ denote NMOS transistors for input control, each of which is simultaneously controlled in accordance with the clock signal C1 input to the gate thereof. Thus, when the clock signal C1 is at H level, the input signals are transferred to internal nodes Q0, Q1 and Q2 of the priority circuit.

On the other hand, reference numerals $804_0$, $804_1$ and $804_2$ denote PMOS transistors serially connected between H potential and the output terminal HIT. The source of the PMOS transistor $804_0$ with the highest priority level is connected to the H potential, and the drain of the PMOS transistor $804_2$ with the lowest priority level is connected to the output terminal HIT. In each of the transistors, source potential is transferred to its drain when the signal input to its gate is at L level. At this point, the sources of the PMOS transistors $804_0$, $804_1$ and $804_2$ are respectively designated as propagating signal nodes P0, P1 and P2. Reference numerals $803_0$, $803_1$ and $803_2$ denote NMOS transistors whose sources are grounded and whose drains are connected to the drains of the PMOS transistors $804_0$, $804_1$ and $804_2$, respectively. The gates of the NMOS transistors $803_0$, $803_1$ and $803_2$ and the PMOS transistors $804_0$, $804_1$ and $804_2$ are respectively connected to the nodes Q0, Q1 and Q2 so as to receive the input signals. In accordance with the input signals, the NMOS and PMOS transistors are exclusively controlled.

Also, reference numerals $805_0$, $805_1$ and $805_2$ denote two-input AND circuits respectively having one input terminals connected to the nodes Q0, Q1 and Q2 and the other input terminals connected to the sources of the PMOS transistors $804_0$, $804_1$ and $804_2$. Thus, logical products of the inputs are output to the output terminals OUT0, OUT1 and OUT2 as binary address signals.

Furthermore, reference numerals $806_0$, $806_1$ and $806_2$ denote reset circuits. Since the reset circuits included in the respective priority circuit elements have the identical configuration, the configuration of the reset circuit $806_1$ alone will be herein described. The reset circuit $806_1$ includes three NMOS transistors $806_{1a}$, $806_{1b}$ and $806_{1c}$. The source and the drain of the NMOS transistor $806_{1a}$ are connected between the output terminal OUT1 and the gate of the NMOS transistor $806_{1b}$, and the NMOS transistors $806_{1c}$ and $806_{1b}$ are serially connected between the node Q1 and the ground. Also, the gate of the NMOS transistor $806_{1a}$ is connected to the clock terminal C3 and the gate of the NMOS transistor $806_{1c}$ is connected to the clock terminal C2. The signals input from these two clock terminals C2 and C3 (hereinafter referred to as the clock signals C2 and C3) are used for simultaneously controlling the priority circuit elements similarly to the clock signal C1.

Owing to this configuration, in the case where the input signal IN1 and potential on the node Q1 are at H level and potential on the propagating signal node P1 is at H level, namely, in the case where the signal on the output terminal OUT1 is at H level, when the clock signal C3 is at H level, the NMOS transistor $806_{1a}$ is turned on so as to transfer the H potential of the output terminal OUT1 to the gate of the NMOS transistor $806_{1b}$. Therefore, the NMOS transistor $806_{1b}$ is turned on. At this point, when the clock signal C2 is at H level, the NMOS transistors $806_{1b}$ and $806_{1c}$ are both turned on, and hence, the node Q1 is reset to L potential. Alternatively, in the case where the input signal IN1 and the potential on the node Q1 are at L level, namely, in the case where the signal on the output terminal OUT1 is at L level, when the clock signal C3 is at H level, the NMOS transistor $806_{1a}$ is turned on so as to transfer the L potential of the output terminal OUT1 to the gate of the NMOS transistor $806_{1b}$. Therefore, the NMOS transistor $806_{1b}$ is turned off, and hence, the clock signal C2 undergoes a H transition. As a result, even when the NMOS transistor $806_{1c}$ is turned on, the potential on the node Q1 is kept at L level.

Next, as an example of the case where a plurality of H-level signals are input to the input terminals IN0, IN1 and IN2 (hereinafter signals input to these input terminals are designated as input signals IN0, IN1 and IN2), an operation performed when the input signal IN0 is at L level and the input signals IN1 and IN2 are equal to each other and at H level will be described.

In this case, the clock signal C1 first undergoes a H transition, and the NMOS transistors $802_0$, $802_1$ and $802_2$ are turned on. Therefore, signals on the nodes Q0, Q1 and Q2 are at L, H and H level, respectively, the PMOS transistors $804_0$, $804_1$ and $804_2$ are placed in an on state, an off state and an off state, respectively, and the NMOS transistors $803_0$, $803_1$ and $803_2$ are placed in an off state, an on state and an on state, respectively. Accordingly, potentials on the propagating signal nodes P0, P1 and P2 and the output terminal HIT are at H, H, L and L level, respectively. Therefore, as a result of the operations performed by the AND circuits $805_0$, $805_1$ and $805_2$, signals on the output terminals OUT0, OUT1 and OUT2 undergo a L transition, a H transition and a L transition, respectively. This means that the second terminal has the highest priority level out of the input terminals having received the H-level signals.

Next, potentials on the nodes Q0, Q1 and Q2 are set to L, L and H level, respectively by the reset circuits $806_0$, $806_1$ and $806_2$ receiving these output signals at L, H and L level and the clock signals C2 and C3, namely, merely the node Q1 corresponding to the H-level output signal is rest, so that the corresponding output signal undergoes a H to L transition. Thus, the PMOS transistor $804_1$ is turned on and the NMOS transistor $803_1$ is turned off, and therefore, the potentials on the propagating signal nodes P0, P1 and P2 and the output terminal HIT are set to H, H, H and L level, respectively. In other words, the H-level propagating signal is propagated to the propagating signal node P2, the output signals OUT0, OUT1 and OUT2 respectively at L, L and H level are output through the operations of the AND circuits $805_0$, $805_1$ and $805_2$, and it is found, as a result of the aforementioned reset operation, that the H-level input having the second highest priority level corresponds to the third input signal IN2.

In this manner, even in the case where a plurality of H-level signals are input to the signal input terminals IN0, IN1 and IN2, signals with higher priority levels are successively selected, merely one H-level signal is output to one of the output terminals OUT0, OUT1 and OUT2, and it is indicated by outputting a signal at L (active L) level to the output terminal HIT that that at least one H-level signal is input to any of the nodes Q0, Q1 and Q2. Even when the number of input signals is further increased, a similar operation may be performed by additionally providing the priority circuit elements 801. This priority circuit is disclosed in Japanese Laid-Open Patent Publication No. 60-59595.

A conventional priority circuit 900 shown in FIG. 9 can perform similar priority processing but is different from the priority circuit 800 of FIG. 8 as follows: The PMOS transistors $804_0$, $804_1$ and $804_2$ are respectively replaced with NMOS transistors $904_0$, $904_1$ and $904_2$; the NMOS transistors $803_0$, $803_1$ and $803_2$ are respectively replaced with PMOS transistors $903_0$, $903_1$ and $903_2$; the AND circuits $805_0$, $805_1$ and $805_2$ are respectively replaced with NOR circuits $905_0$, $905_1$ and $905_2$; inverters $907_0$, $907_1$ and $907_2$ are additionally provided respectively between the nodes Q0, Q1 and Q2 and the gates of the NMOS transistors $904_0$, $904_1$ and $904_2$ and the PMOS transistors $903_0$, $903_1$ and $903_2$; and the propagating signal node P0 is fixed to L level instead of H level. However, the priority circuit 900 has an active H configuration in which the output terminal HIT outputs a H-level signal when a H-level signal is input to any of the input terminals, namely, when a HIT signal is detected.

In general, when transistors have the same size, a node potential can be lowered from VDD potential to 0 V by turning an NMOS transistor on faster than increasing a node potential from 0 V to the VDD potential by turning a PMOS transistor on. Therefore, the priority circuit 900 of FIG. 9 can perform the priority processing faster than the priority circuit 800 of FIG. 8.

A conventional priority circuit 1000 shown in FIG. 10 is different from the priority circuit 900 of FIG. 9 in a portion for performing the logic operation connected to the output terminals. In the priority circuit of FIG. 9, results of the logic operation performed by the NOR circuits on inverted signals of the input signals and the potentials on the propagating signal nodes are output as the output signals OUT0, OUT1 and OUT2. In contrast, in the priority circuit of FIG. 10, results of logic operation performed by AND circuits receiving inverted signals of potentials on propagating signal nodes on the input side of the priority circuit elements and potentials on propagating signal nodes on the output side are output as output signals OUT0, OUT1 and OUT2. The operation of the priority circuit of FIG. 10 is the same as that of the priority circuit of FIG. 9.

However, in the conventional configuration of FIG. 10, for example, in the case where the input signals IN0, IN1 and IN2 are respectively at H, L and L level and potentials on the propagating signal nodes P0, P1 and P2 and the output terminal HIT are respectively at L, H, H and H level, the H-level signal is transferred from the propagating signal node P1 to the propagating signal node P2 or from the propagating signal node P2 to the output terminal HIT through an NMOS transistor $1004_1$ or $1004_2$. Therefore, the propagated signal is lowered in its voltage correspondingly to the threshold voltages of the NMOS transistors $1004_1$ and $1004_2$. As a result, the H-level signal cannot attain desired high potential but is harmfully affected by noise or the like. Also, when the number of input signals is increased, the speed of the priority processing is disadvantageously lowered because the number of serially connected NMOS transistors is also increased.

Furthermore, in order to detect input signals including two or more H-level signals, it is necessary to reset the nodes Q0, Q1 and Q2 by using the clock signals C2 and C3 and the output signals OUT0, OUT1 and OUT2 every time one H-level signal with second or lower priority level is detected. Therefore, such processing cannot be completed in one cycle.

These problems also occur in the priority circuits of FIGS. 8 and 9 using signals with different polarities.

SUMMARY OF THE INVENTION

The present invention was devised to overcome the aforementioned conventional problems, and a first object of the invention is accurately transferring a H-level signal to an output terminal HIT by preventing H potential from being lowered by a propagating signal node, so as to avoid malfunction derived from influence of noise.

Furthermore, in addition to the first object, a second object of the invention is, in a priority circuit having a large number of inputs, in the case where there is a continuous portion where a relevant signal is not input, increasing a speed of the whole priority processing by omitting the same and repeated operation performed in this portion. Moreover, a third object of the invention is providing a priority circuit capable of performing priority processing within one cycle even when input signals include two or more H-level signals.

In order to achieve the first object, a propagating signal node of each priority circuit element is precharged to given high potential in the present invention. Furthermore, in order to achieve the second object, the priority circuit of this invention includes a bypass circuit for rapidly propagating given low potential to a priority circuit element of a lower order when specific high order input signals do not include a relevant H-level signal; and a bypass control circuit for controlling the bypass circuit. Alternatively, the priority circuit of the invention further includes a circuit that performs another priority processing, within one cycle, by referring to an output result of the priority processing performed by one priority circuit.

Specifically, the priority circuit of this invention that receives m (wherein m is an integer of two or more) binary input signals, includes m priority circuit elements each including an NMOS transistor and HIT detecting means, an ith (wherein i is an integer not more than 1 and not less than m) priority circuit element that receives an ith binary input signal out of the m binary input signals and a (i+1)th priority circuit element with priority level lower by one than the ith priority circuit element being serially connected to each other via an ith propagating signal node for connecting an ith NMOS transistor and a (i+1)th NMOS transistor respectively included in the ith and (i+1)th priority circuit elements, when the ith binary input signal is a relevant signal with a given value, potential on the ith propagating node is set to given high potential by ith HIT detecting means included in the ith priority circuit element, and when the ith binary input signal is a non-relevant signal, the ith NMOS transistor transfers potential on a (i−1)th propagating signal node to the ith propagating signal node for successively propagating a hit detection result to an mth propagating signal node, and in the case where the m binary input signals include one or more relevant signals, a given detection signal is output to a HIT output terminal connected to the mth propagating signal node, and for outputting an address of a relevant signal with the highest priority level, a signal different from signals output from the other priority circuit elements is output from a priority circuit element corresponding to a portion where the relevant signal with the highest priority level, out of the input relevant signals, defined on the basis of a given priority rule has been input, and the priority circuit further includes priority circuit controlling means that is inserted between a 0th propagating signal node and given low potential and controls connection/disconnection between the 0th propagating signal node and the given low potential in response to a given control signal; and precharging means that is included in the ith priority circuit element and precharges, to given high potential, potential on the ith propagating signal node in accordance with the given control signal when the priority circuit is in a non-operational state.

In one aspect of the priority circuit, ith precharging means includes a PMOS transistor, which is connected to given high potential at a source thereof and connected to the ith propagating signal node at a drain thereof and is controlled in accordance with a signal input to a gate thereof.

In another aspect of the priority circuit, the priority circuit controlling means includes an NMOS transistor, and the NMOS transistor is inserted between the priority circuit and given low potential for controlling connection/disconnection between the priority circuit and the given low potential in accordance with a signal input to a gate thereof.

In still another aspect, the priority circuit further includes a bypass circuit connected between the ith propagating signal node and a (i+n) (wherein n is an integer of one or more) propagating signal node for bypassing at least one priority circuit element disposed therebetween, for bypassing, in response to a given bypass control signal, the at least one priority circuit element by short-circuiting the ith and the (i+n)th propagating signal nodes; and a bypass control circuit for inputting the bypass control signal to the bypass circuit, and when a relevant signal is input to none of (i+1)th through (i+n)th input terminals, the bypass control circuit inputs the bypass control signal to the bypass circuit.

In still another aspect, the priority circuit further includes at least one additional priority circuit, serially connected at a second stage, for further performing priority processing on the basis of a result of priority processing having been performed on the m binary input signals in accordance with the given priority rule, in such a manner that the priority processing is simultaneously performed a given number of times on a plurality of relevant signals included in the m binary input signals, and the additional priority circuit serially connected at the second stage performs the priority processing on m new input signals in which a signal output as a relevant signal from the priority circuit disposed at a first stage has been changed into a non-relevant signal.

As described above, according to the present invention, the precharging means precharges the propagating signal nodes to the H potential when the priority circuit is in a non-operational state. Therefore, in propagating the H potential through serially connected NMOS transistors, voltage lowering corresponding to the threshold voltages of the respective NMOS transistors can be suppressed.

Furthermore, according to the present invention, a specific portion where no relevant signal is input is detected, and the priority processing operation of a priority circuit element group disposed in this portion is bypassed by the bypass control circuit so as to omit an unnecessary circuit operation. Thus, the processing time can be shortened and the whole priority processing can be rapidly performed.

Moreover, according to the present invention, at least one second priority circuit is additionally provided at a stage following one priority circuit. Thus, without performing a reset operation after the priority processing operation of the priority circuit at the first stage, new input signals in which a relevant signal detected at the first stage has been changed into a non-relevant signal can be generated by referring to the result of the priority operation performed at the first stage, and another priority processing operation is performed on the new input signals. Therefore, when the input signals include a plurality of relevant signals, the priority processing for the plural relevant signals can be performed in one cycle.

DETAILED DESCRIPTION OF THE INVENTION

Preferred embodiments of a priority circuit of the present invention will now be described with reference to the accompanying drawings.

Embodiment 1

Figure 1:
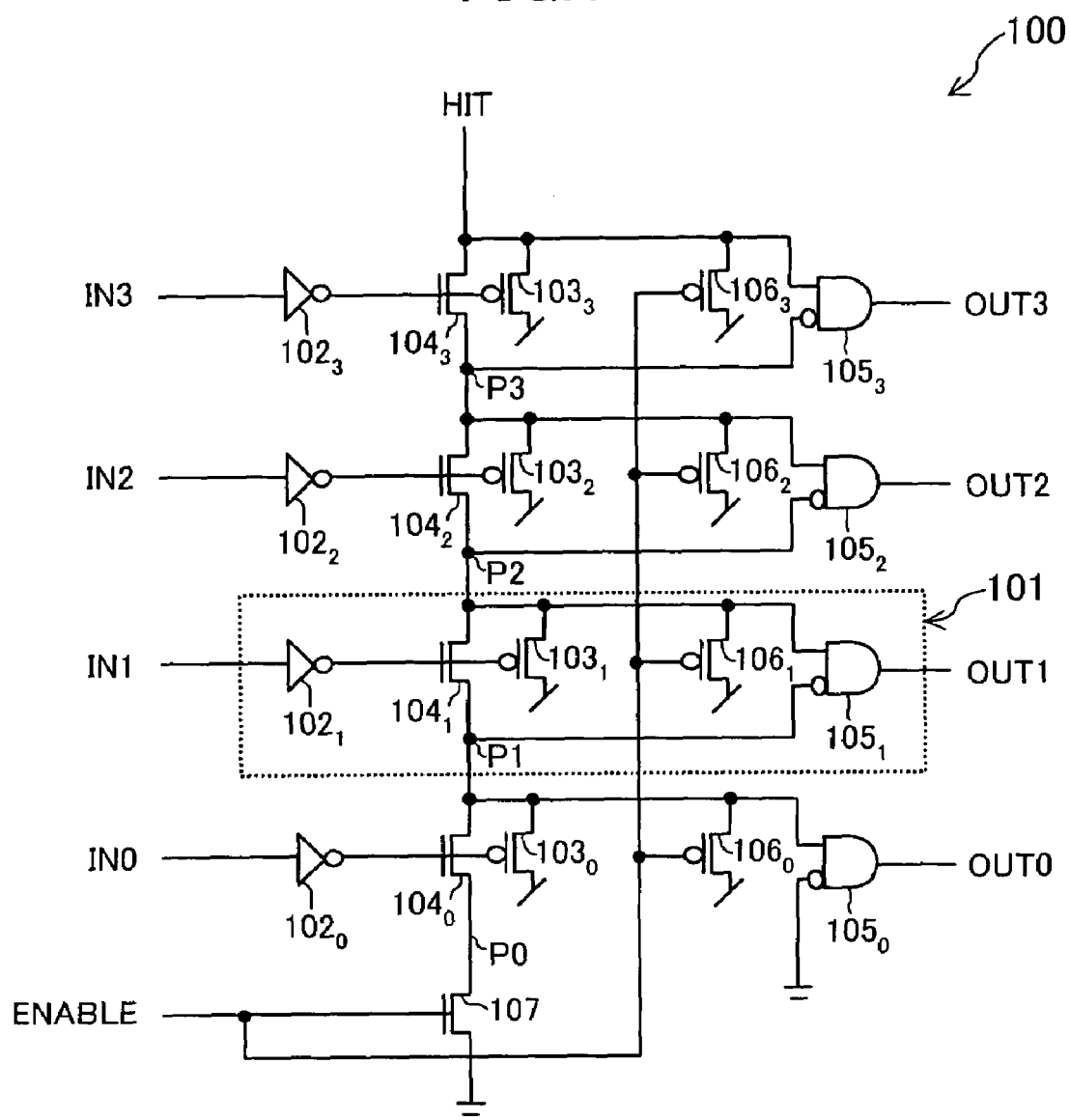
FIG. 1 is a diagram for showing the configuration of a priority circuit according to Embodiment 1 of the invention.

In a priority circuit of this embodiment, as shown in FIG. 1, four binary input signals IN0, IN1, IN2 and IN3 are subjected to priority processing for establishing the priority level of a relevant signal, and it is found by outputting a given detection signal to an output terminal HIT whether or not the input signals include the relevant signal. When the input signals include the relevant signal, a different signal is output to merely one output terminal with the highest priority level out of four output terminals OUT0, OUT1, OUT2 and OUT3 so as to output a vector of four binary output signals OUT0, OUT1, OUT2 and OUT3, namely, a binary address of the relevant signal.

FIG. 1 shows an exemplified configuration of this four-input priority circuit. In FIG. 1, a reference numeral 100 denotes the priority circuit, a reference numeral 101 denotes one priority circuit element that performs processing for detecting a relevant signal with respect to each of the four input signals, and the priority circuit of this embodiment includes four (namely, m=4) priority circuit elements. Herein, the priority circuit element 101 of FIG. 1 corresponding to the input signal IN1 will be described.

The input terminal IN1 is connected through an inverter $102_1$ to gates of a PMOS transistor $103_1$ and an NMOS transistor $104_1$ that are connected to each other through drains thereof. The transistors $103_1$ and $104_1$ are exclusively controlled in accordance with an inverted signal of an input signal IN1 input from the input terminal IN1 (hereinafter simply designated as the input signal IN1). The source of the PMOS transistor $103_1$ is connected to H potential. Owing to the connection of the PMOS transistor $103_1$ and the NMOS transistor $104_1$, when the input signal IN1 is at L level, the NMOS transistor $104_1$ is turned on so as to transfer its source potential to its drain, and when the input signal IN1 is at H level, the PMOS transistor $103_1$ (corresponding to HIT detecting means) is turned on so as to output the H potential to its drain, and thus, it is found that a relevant signal has been input (namely, a relevant signal is hit). Herein, the source of the NMOS transistor $104_1$ is designated as a propagating signal node P1 and the drain thereof is designated as a propagating signal node P2. These two propagating signal nodes P1 and P2 are connected to a two-input AND circuit $105_1$, whereas the input terminal of the AND circuit $105_1$ connected to the propagating signal node P1 is an inverted input terminal. Therefore, the AND circuit $105_1$ outputs, as an output signal OUT1 of the priority circuit element 101, a logical product of a logical value of the propagating signal node P2 and an inverted value of a logical value of the propagating signal node P1. The priority circuit element 101 of this embodiment further includes a PMOS transistor $106_1$. The source of the PMOS transistor $106_1$ is connected to H potential and the drain thereof is connected to the propagating signal node P2.

Priority circuit elements with the second or lower priority level out of these four priority circuit elements, namely, the priority circuit elements corresponding to the input signals IN1 through IN3, have the same configuration as that of the priority circuit element 101 described above. Also, a priority circuit element with the highest priority level, namely, a priority circuit element corresponding to the input signal IN0, is different from the other three priority circuit elements in the inverted input terminal of the AND circuit $105_0$ being connected to the ground.

In the priority circuit 100, the four priority circuit elements are serially connected to one another via the propagating signal nodes, and an NMOS transistor 107 for switching the priority circuit between an operational mode and a non-operational mode is inserted between ground (given low potential) and the source of the NMOS transistor $104_0$ included in the priority circuit element with the highest priority level. Herein, connection nodes for serially connecting the sources and the drains of the NMOS transistors $104_0$, $104_1$, $104_2$ and $104_3$ of the respective priority circuit elements correspond to the propagating signal nodes P0, P1, P2 and P3 in this order from the ground side. Specifically, a connection node between the NMOS transistor 107 and the first priority circuit element corresponds to the propagating signal node P0 (namely, the 0th propagating signal node), and connection nodes between the priority circuit elements 101 respectively correspond to the propagating signal nodes P1, P2 and P3. Also, the drain of the NMOS transistor $104_3$ included in the priority circuit element 101 farthest from the NMOS transistor 107 is connected to the output terminal HIT.

The gate of the NMOS transistor 107 is connected to an enable signal input terminal ENABLE, so as to connect the propagating signal node P0 to the ground when a signal ENABLE input from this input terminal (a given control signal) is at H level and to place the propagating signal node P0 in a floating state when the input signal is at L level. In other words, the NMOS transistor 107 functions as a priority circuit controlling circuit (priority circuit controlling means) for placing the priority circuit 100 in an operational mode when the input signal is at H level and for placing it in a non-operational mode when the input signal is at L level.

The enable signal input terminal ENABLE for controlling the NMOS transistor 107 is connected to the gate of the NMOS transistor 107 and is also connected to the gate of the PMOS transistor $106_1$ of the priority circuit element 101, so as to exclusively control the NMOS transistor 107 and the PMOS transistor $106_1$. Thus, when the enable input signal ENABLE is at H level, namely, when the priority circuit 100 is in the operational mode, the PMOS transistor $106_1$ is placed in an off state, and when the enable input signal ENABLE is at L level, namely, when the priority circuit 100 is in the non-operational mode, the PMOS transistor $106_1$ is placed in an on state and the propagating signal node P2 is precharged to H potential (given high potential). In this manner, the PMOS transistor $106_1$ has a function as a precharge circuit (precharging means).

The priority circuit 100 of this embodiment configured in the aforementioned manner has what is called an active H circuit configuration in which when any of input signals is a H-level signal, a H-level signal is output to the output terminal HIT for indicating that any input terminal has received a H-level signal. Furthermore, a H-level signal is output to merely one output terminal, out of the output terminals OUT0 through OUT3, corresponding to an input terminal with the highest priority level out of the input terminals having received H-level signals. In this embodiment, the priority level is the highest in the input signal disposed in the lowermost portion of the drawing and is lowered in the upward direction in the drawing.

Next, the operation of the priority circuit 100 of this embodiment configured in the aforementioned manner will be described.

Herein, the description will be given on an exemplified case where a H-level signal is input to the input terminal IN0 alone, namely, where the input signals IN0, IN1, IN2 and IN3 are respectively at H, L, L and L level.

In this embodiment, before defining the values of the input signals IN0, IN1, IN2 and IN3, the propagating signal nodes P1, P2 and P3 and the output terminal HIT are precharged to VDD potential by setting the precharge enable signal ENABLE to L potential, and the precharge enable signal ENABLE is allowed to undergo a H transition at the same time as defining the values of the input signals IN0, IN1, IN2 and IN3.

In the state where the precharge enable signal ENABLE is kept at L potential, the propagating signal nodes P1, P2 and P3 and the output terminal HIT are precharged to the VDD potential because the PMOS transistors $106_0$, $106_1$, $106_2$ and $106_3$ are in an on state. Also, since the NMOS transistor 107 is in an off state, the propagating signal node P0 is placed in a floating state. At this point, when the input signals IN0, IN1, IN2 and IN3 respectively at H, L, L and L level are input, the outputs of the inverters $102_0$, $102_1$, $102_2$ and $102_3$ are respectively at L, H, H and H level. Therefore, the PMOS transistors $103_0$, $103_1$, $103_2$ and $103_3$ are respectively placed in an on state, an off state, an off state and an off state, and the NMOS transistors $104_0$, $104_1$, $104_2$ and $104_3$ are respectively placed in an off state, an on state, an on state and an on state. Also, the propagating signal node P0 is set to floating potential, and the propagating signal nodes P1, P2 and P3 and the output terminal HIT are all set to the VDD potential.

In such a state, when the precharge enable signal ENABLE undergoes a H transition, all the PMOS transistors $106_0$, $106_1$, $106_2$ and $106_3$ are turned off and the NMOS transistor 107 is turned on, and hence, the priority circuit 100 enters an operational state.

This instant, the potential on the propagating signal node P0 changes from the floating potential to L potential, but since the NMOS transistor $104_0$ is in an off state in this embodiment, the potential on the other propagating signal nodes P1, P2 and P3 and the output terminal HIT remains to be the VDD potential. Thus, the AND circuit $105_0$ receives L potential at its grounded inverted input terminal and the propagating signal node P1 receives H potential, and therefore, a logical product of them, namely, H potential, is output to the output terminal OUT0. Also, the AND circuits $105_1$, $105_2$ and $105_3$ receive H potential both at their inverted input terminals and the other input terminals, and therefore, signals respectively at L, L and L level are output to the output terminals OUT1, OUT2 and OUT3.

Accordingly, through the above-described operation, since the signal at H level is output to the output terminal HIT in response to the input signals IN0, IN1, IN2 and IN3 respectively at H, L, L and L level, it is found that a H-level signal is input to any of the input terminals, and at the same time, since the output signals OUT0, OUT1, OUT2 and OUT3 respectively at H, L, L and L level are output, it is found that the input terminal having received the H-level signal is the first input terminal IN0.

Figure 2A:
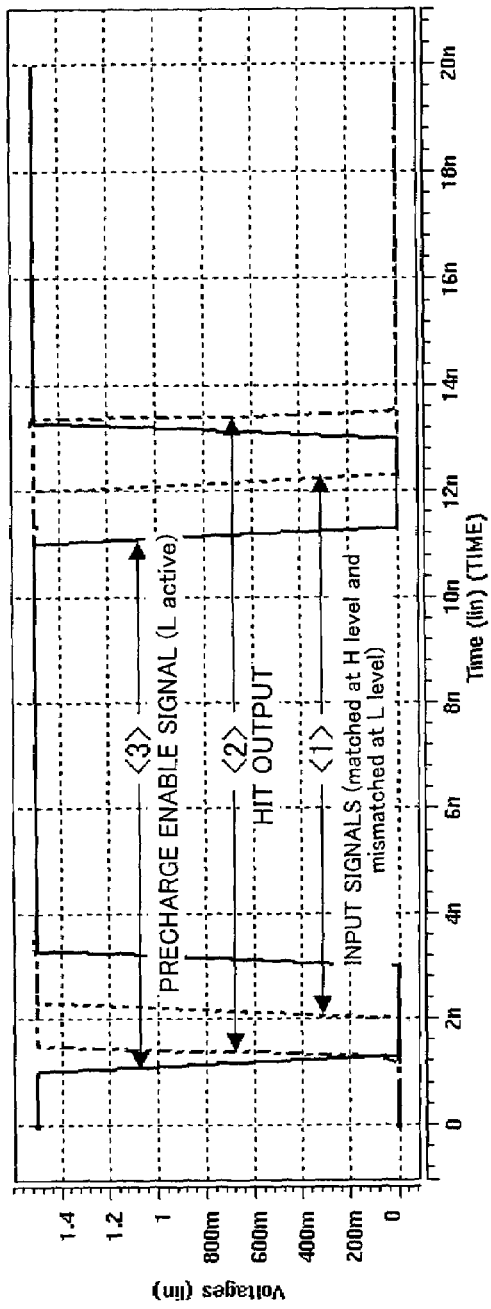
FIGS. 2A and 2B are graphs for comparing results of simulation performed in the priority circuit of Embodiment 1 and a conventional priority circuit.
Figure 2B:
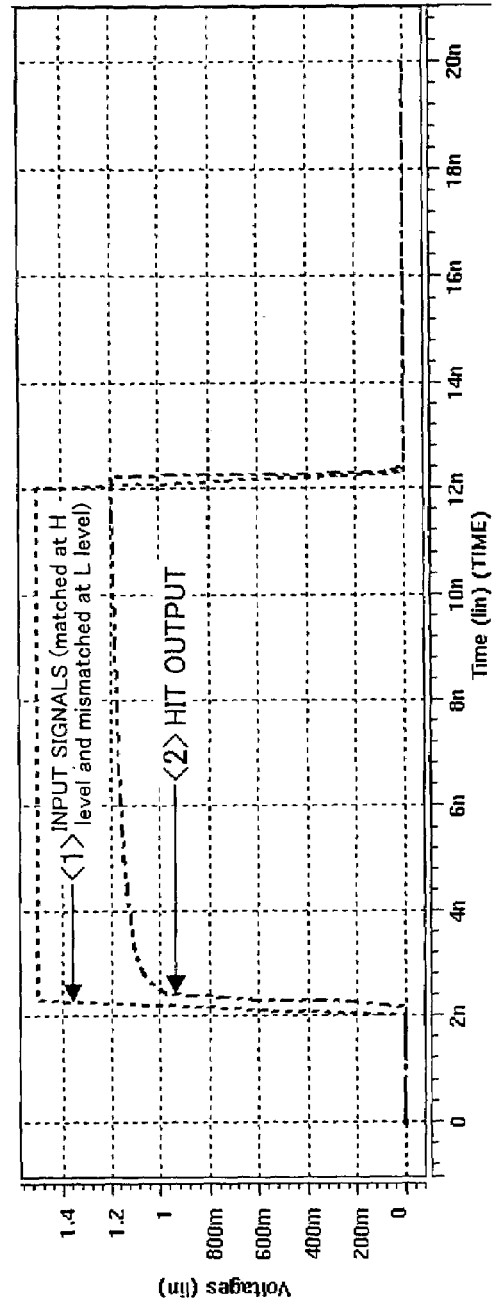

FIGS. 2A and 2B show comparison of simulation results obtained in the priority circuit of this embodiment and a conventional priority circuit on the assumption that input signals IN0, IN1, IN2 and IN3 respectively at H, L, L and L level are input. FIG. 2A shows a voltage waveform <1> of the input signals, a voltage waveform <2> of the potential on the output terminal HIT and a voltage waveform <3> of the precharge enable signal in the priority circuit of this embodiment, and FIG. 2B shows a voltage waveform <1> of the input signals and a voltage waveform <2> of the potential on the output terminal HIT in the conventional priority circuit.

As shown in FIG. 2A, the precharge enable signal undergoes a L transition at time of 1.2 ns, so as to precharge the voltage on the output terminal HIT to the VDD potential of 1.5 V. Then, at time of 2 ns, the input signals are input, and after input potential becomes equal to the VDD potential, the precharge enable signal undergoes a H transition at time of 3.2 ns, and thus, the priority circuit enters the operational state. Accordingly, in this embodiment, when the priority circuit enters the operational state, the output terminal HIT has already attained the VDD potential. In contrast, as shown in FIG. 2B, in the conventional priority circuit that does not have a precharge circuit, the input signals with the waveform <1> are input at time of 2 ns, and after input potential becomes equal to the VDD potential of 1.5 V, the voltage on the output terminal HIT cannot immediately reach the VDD potential but is gently increased after time of 2.4 ns. Even when the input signal undergoes a L transition at time of 12 ns, the voltage on the output terminal HIT cannot reach the VDD potential of 1.5 V but reaches merely 1.2 V.

As described above, since the potential on the output terminal HIT has attained the VDD potential when the priority circuit enters the operational state in this embodiment, the priority circuit can be operated without causing malfunction derived from noise.

Although the number of input signals is four in this embodiment, even when the number of input signals is increased, a similar operation can be performed by additionally providing the priority circuit elements 101.

Embodiment 2

A priority circuit according to Embodiment 2 of the invention will now be described.

Figure 3A:
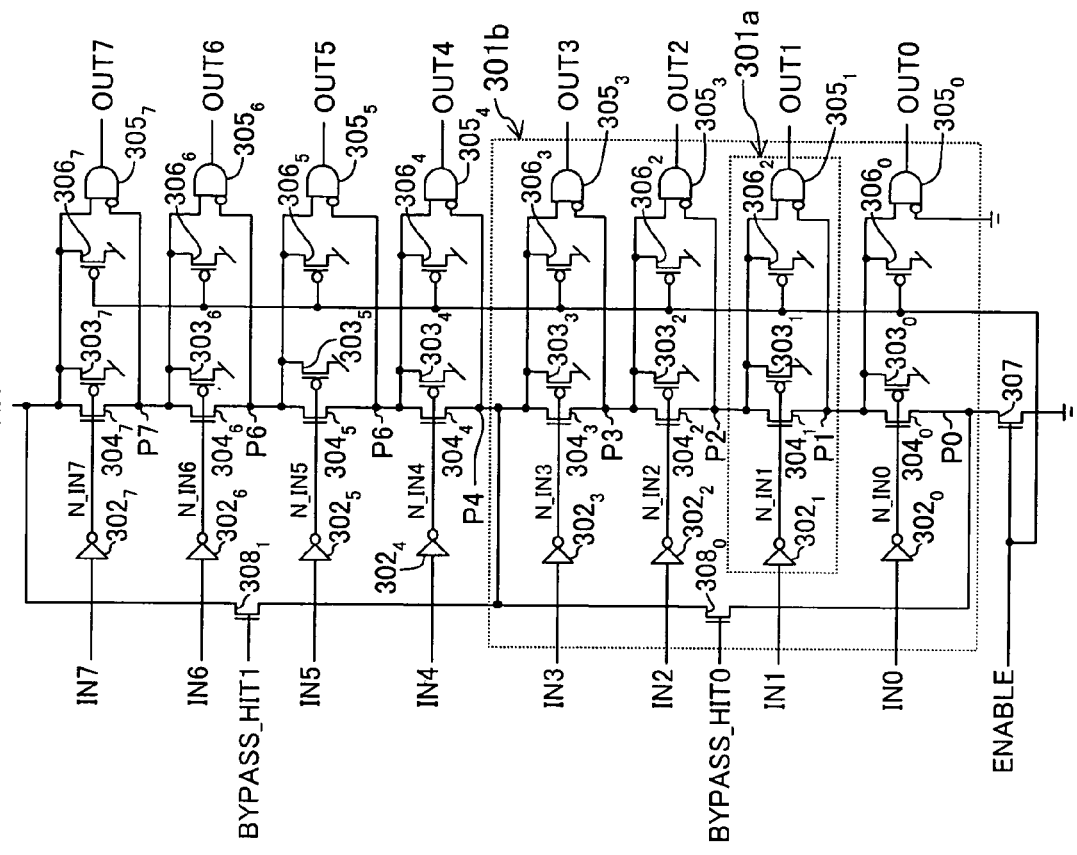
FIGS. 3A and 3B are diagrams for showing the configuration of a priority circuit according to Embodiment 2 of the invention.

FIG. 3A shows the priority circuit of this embodiment for performing priority processing on eight inputs IN0 through IN7 so as to output a binary address of a relevant signal.

In FIG. 3A, a reference numeral 300 denotes the priority circuit and a reference numeral 301a denotes a priority circuit element included in the priority circuit. Also, a reference numeral 301b denotes a priority circuit element group composed of a group of four priority circuit elements 301a.

The priority circuit of this embodiment is different from the priority circuit of Embodiment 1 shown in FIG. 1 as follows: The number of input signals is eight in this embodiment; and the two priority circuit element groups 301b each composed of the four priority circuit elements 301a can be bypass controlled in this embodiment. Specifically, in the two priority circuit element groups 301b, propagating signal nodes of the highest order to the lowest order between NMOS transistors serially connected for transferring a propagation signal, namely, a path from a propagating signal node P0 to a propagating signal node P4 and a path from the propagating signal node P4 to an output terminal HIT, are bypassed through the drains and the sources of NMOS transistors $308_0$ and $308_1$, so as to bypass the priority circuit element groups 301b when a signal input to the gate of the NMOS transistor is at H level.

Figure 3B:
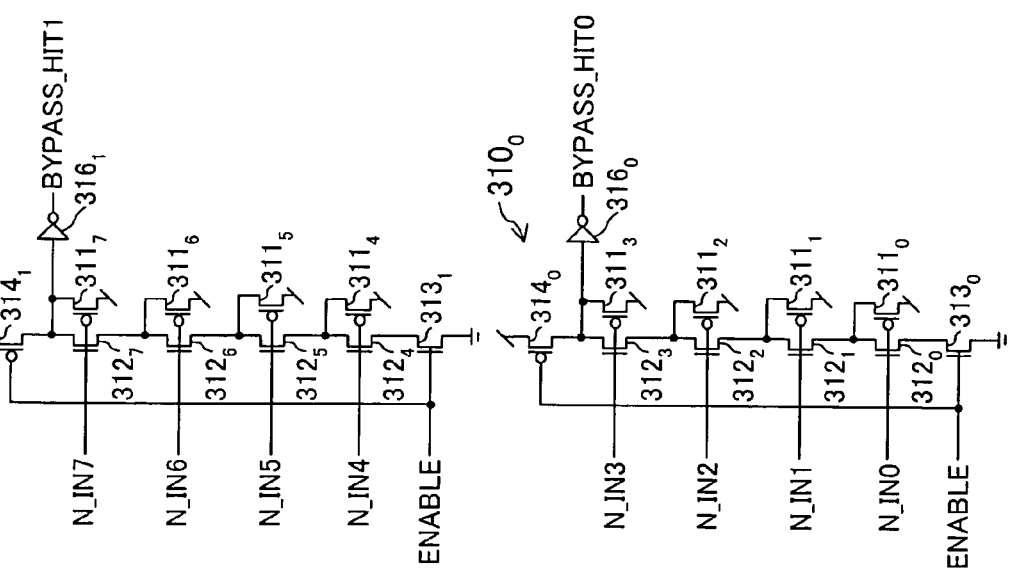

A circuit for performing this bypass control is bypass enable circuits $310_0$ and $310_1$ shown in FIG. 3B. In the bypass enable circuit $310_0$, four NMOS transistors $312_0$, $312_1$, $312_2$ and $312_3$ and four PMOS transistors $311_0$, $311_1$, $311_2$ and $311_3$ together form a circuit similar to a circuit composed of four NMOS transistors $304_0$, $304_1$, $304_2$ and $304_3$ and PMOS transistors $303_0$, $303_1$, $303_2$ and $303_3$ in the priority circuit element group 301b. Furthermore, inverted input signals N_IN0, N_IN1, N_IN2 and N_IN3 are respectively input to the gates of four pairs of NMOS and PMOS transistors sharing their drains. These serially connected NMOS transistors are serially inserted between an NMOS transistor $313_0$ grounded at its source and a PMOS transistor $314_0$ connected to VDD potential at its source. The NMOS transistor $313_0$ and the PMOS transistor $314_0$ are connected, at their gates, to a precharge enable signal input terminal ENABLE so as to be exclusively controlled in accordance with a precharge enable input signal ENABLE input to this terminal. The drain output of the PMOS transistor $314_0$ is inverted by an inverter $316_0$ so as to be output as a bypass control signal BYPASS_HIT0.

Accordingly, when the inverted input signals N_IN0, N_IN1, N_IN2 and N_IN3 include a H-level signal, a H-level signal is output as the bypass control signal BYPASS_HIT0, and when the inverted input signals do not include a H-level signal, a L-level signal is output as the bypass control signal BYPASS_HIT0, so that the NMOS transistor $308_0$ of the priority circuit element group $301b$ can be bypass controlled in accordance with this bypass control signal. Although not described herein, the bypass enable circuit $310_1$ has a similar configuration and is similarly operated.

Now, the operation of the priority circuit of this embodiment having the aforementioned configuration will be described.

In this embodiment, before defining the values of the eight input signals IN0 through IN7, the propagating signal nodes P1 through P7 and the output terminal HIT are precharged to the VDD potential by setting the precharge enable signal ENABLE to L level, and the precharge enable signal ENABLE is allowed to undergo a H transition simultaneously with the definition of the values of the input signals IN0 through IN7. At this point, the operation for precharging the propagating signal nodes P1 through P7 and the output terminal HIT to the VDD potential is completed, and an NMOS transistor 307 is turned on so as to connect the propagating signal node P0 to the ground. At the same time, the priority processing is performed on the input signals IN0 through IN7, so as to output the result of the priority processing from output terminals OUT0 through OUT7 and the output terminal HIT.

On the other hand, in the bypass enable circuit $310_0$, when the precharge enable signal ENABLE is at L level, a node on the input side of the inverter $316_0$ is precharged to H potential. Thus, the bypass control signal BYPASS_HIT0 is fixed to L level, and the precharge enable signal ENABLE is controlled to undergo a H transition at the same time as definition of the input signals IN0 through IN3. Thus, the priority processing is started similarly to that performed in the priority circuit element group $301b$.

Figure 4A:
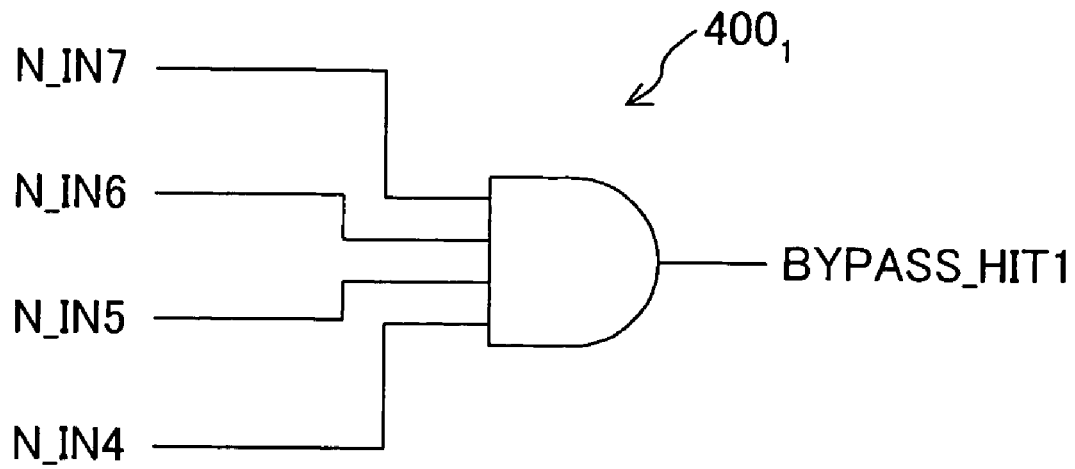
FIGS. 4A and 4B are diagrams for showing a modification of a bypass enable circuit used in Embodiment 2.
Figure 4B:
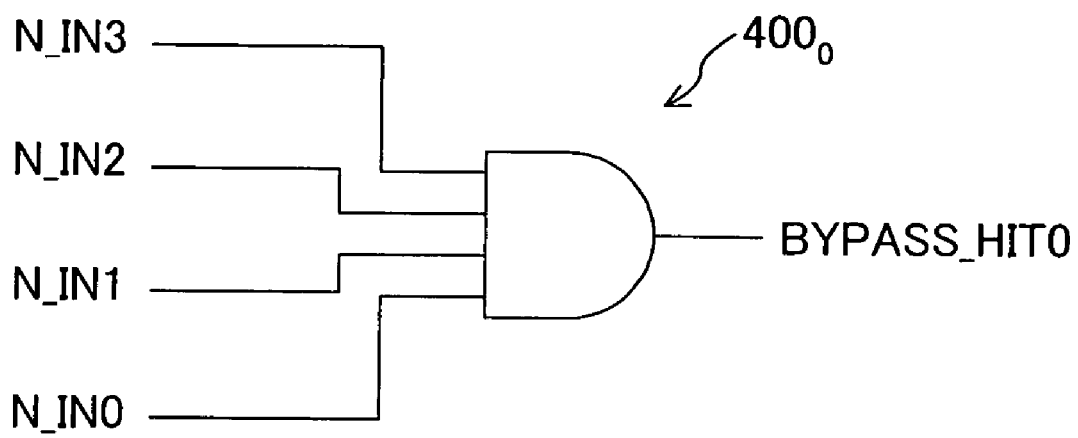

If the input signals IN0 through IN3 do not include a H-level signal, the four input signals N_IN0, N_IN1, N_IN2 and N_IN3 of the bypass enable circuit $310_0$ are all at H level, and hence, the potential on the node on the input side of the inverter $316_0$ is at L level. Therefore, the bypass control signal BYPASS_HIT0 is at H level, and hence the NMOS transistor $308_0$ is turned on. As a result, the four priority circuit elements corresponding to the input signals IN0 through IN3 are bypassed, so that time required for lowering potential on the propagating signal node P4 from the VDD potential to 0 V can be shortened. It is noted that the bypass enable circuit $310_1$ corresponding to the input signals IN4 through IN7 is similarly operated. Furthermore, the bypass enable circuits may be obtained by using AND circuits as shown as circuits $400_1$ and $400_0$ in FIGS. 4A and 4B.

Figure 5:
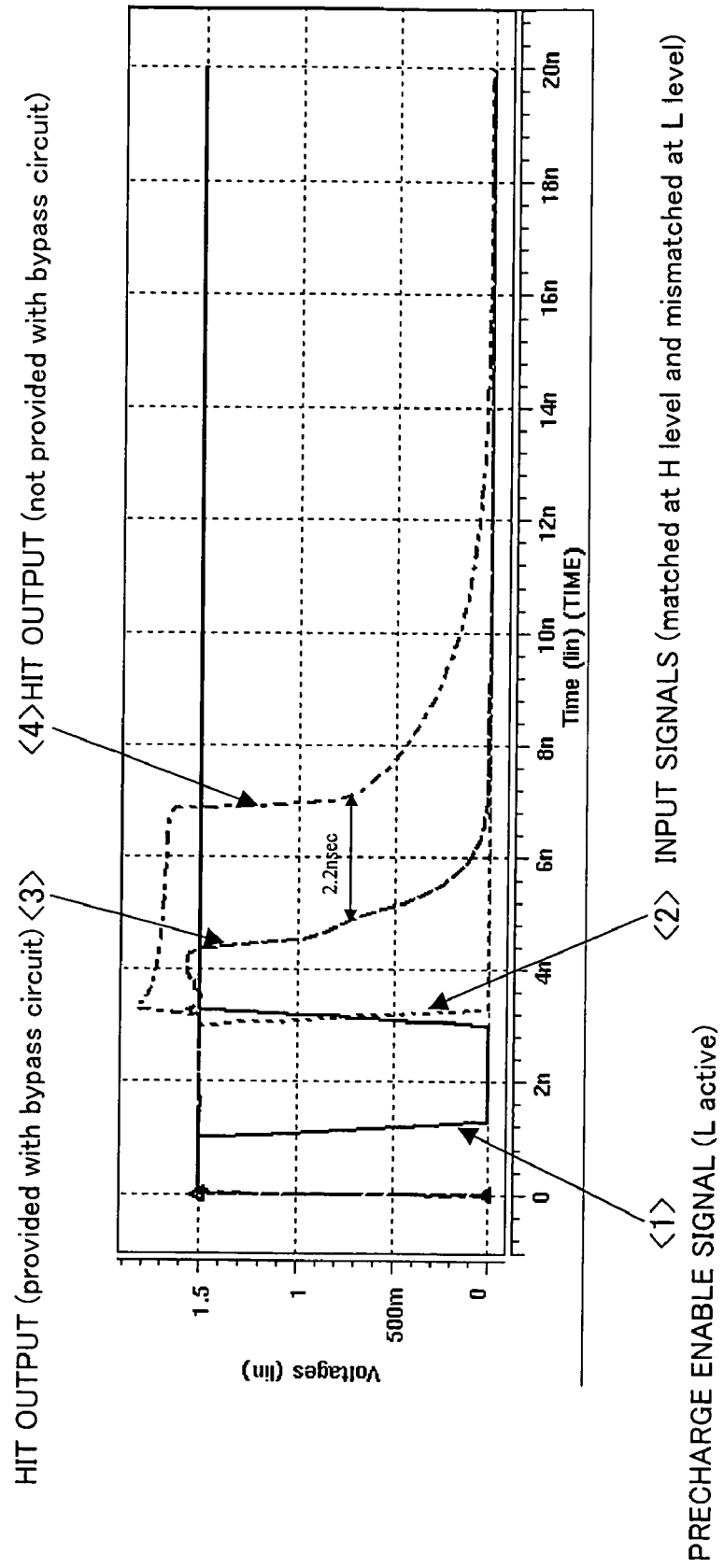
FIG. 5 is a graph for comparing results of simulation performed in the priority circuit of Embodiment 2 and the priority circuit of Embodiment 1.

FIG. 5 shows comparison of the simulation results obtained in the priority circuit of this embodiment and the priority circuit of Embodiment 1 on the assumption that L-level signals are input to all the input terminals. In FIG. 5, a waveform <1> indicates the precharge enable input signal, a waveform <2> indicates the input signals (which are all at L level and hence indicated by one waveform), a waveform <3> indicates the potential on the output terminal HIT of the priority circuit of this embodiment provided with the bypass circuits, and a waveform <4> indicates the potential on the output terminal HIT of the priority circuit of Embodiment 1 not provided with the bypass circuits.

In FIG. 5, when the precharge enable signal shown by the waveform <1> undergoes a L to H transition at time of 3 ns, namely, when the priority circuit is placed in an operational mode, the potential on the output terminal HIT shown by the waveform <4> of the priority circuit not provided with the bypass circuits falls approximately 2.2 ns later than the fall of the potential on the output terminal HIT shown by the waveform <3> of the priority circuit provided with the bypass circuits.

Accordingly, as shown in FIG. 5, when all the input signals are at L level (namely, the input signals are mismatched), the priority circuit of this embodiment attains an operation speed higher by approximately 2.2 ns than the priority circuit of Embodiment 1.

In Embodiment 2, when the number of input signals is increased, the priority circuit elements $301a$ are additionally provided so as to perform a similar operation. Also, each priority circuit element group is composed of four priority circuit elements connected to one another in this embodiment, which does not limit the invention. According to the present invention, each priority circuit element group may be configured so as to minimize the number of serially connected NMOS transistors disposed on the path from the output terminal HIT to the ground GND in order to minimize the time necessary for the propagating signal, which is transferred from the propagating signal node P0 to the output terminal HIT, to reach 0 V from the VDD potential when input signals are mismatched.

Embodiment 3

A priority circuit according to Embodiment 3 of the invention will now be described with reference to the accompanying drawings.

Figure 6:
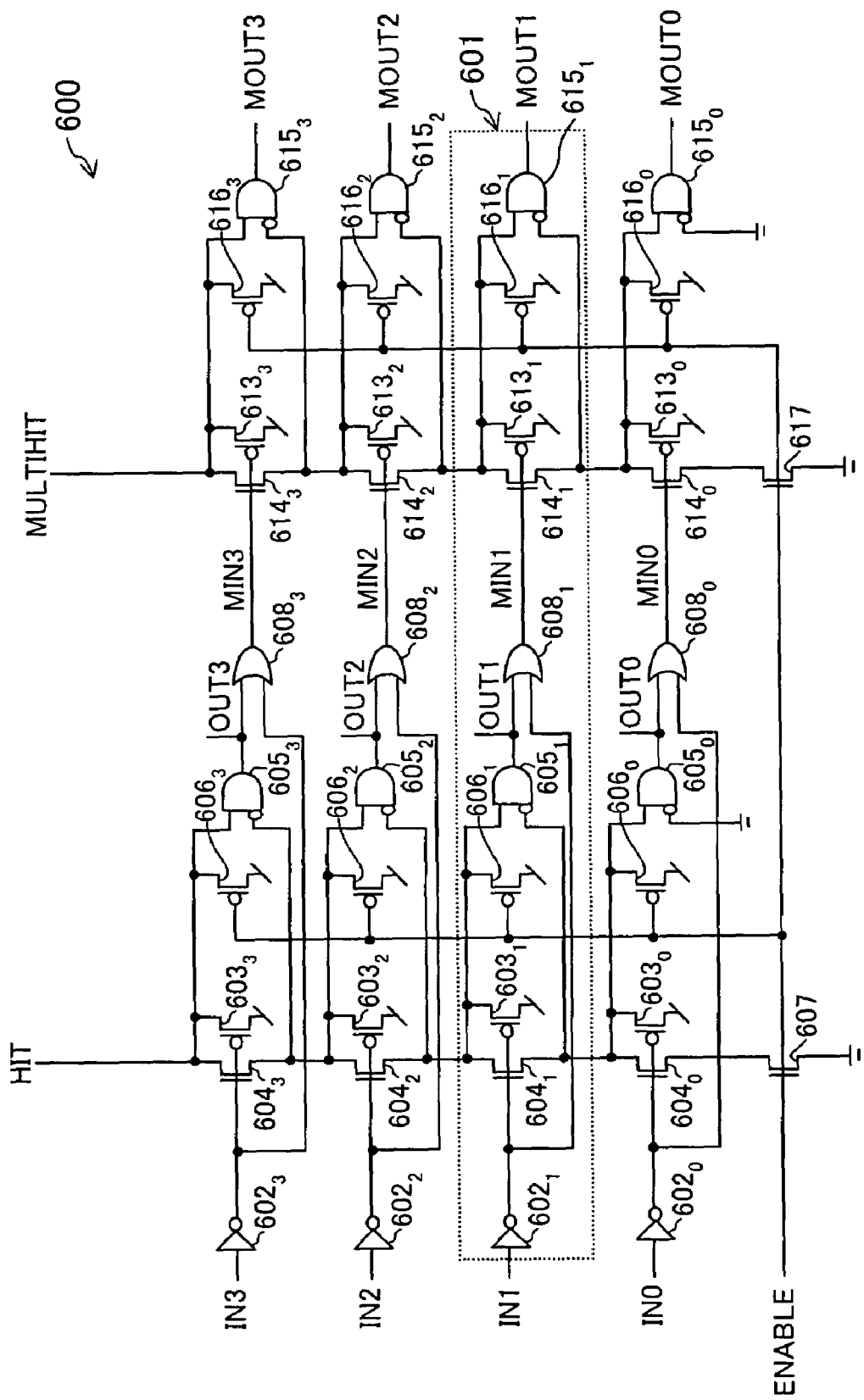
FIG. 6 is a diagram for showing the configuration of a priority circuit according to Embodiment 3 of the invention.

FIG. 6 shows the configuration of the priority circuit of this embodiment. In this embodiment, the priority circuit includes two stages, so as to perform priority processing twice in one cycle. As shown in FIG. 6, the priority circuit of this embodiment performs the priority processing on four inputs so as to output a binary address.

In FIG. 6, a reference numeral 600 denotes the priority circuit. Also, a reference numeral 601 denotes a priority circuit element. In this embodiment, a first-stage priority circuit, which is similar to the priority circuit of Embodiment 1 shown in FIG. 1, includes four inverters $602_0$, $602_1$, $602_2$ and $602_3$, four PMOS transistors $603_0$, $603_1$, $603_2$ and $603_3$, four NMOS transistors $604_0$, $604_1$, $604_2$ and $604_3$, four AND circuits $605_0$, $605_1$, $605_2$ and $605_3$ each receiving an inverted input as one of the two inputs, four PMOS transistors $606_0$, $606_1$, $606_2$ and $606_3$ used for precharging, and an NMOS transistor 607.

Similarly, a second-stage priority circuit includes four PMOS transistors $613_0$, $613_1$, $613_2$ and $613_3$, four NMOS transistors $614_0$, $614_1$, $614_2$ and $614_3$, four AND circuits $615_0$, $615_1$, $615_2$ and $615_3$ each receiving an inverted input as one of the two inputs, four PMOS transistors $616_0$, $616_1$, $616_2$ and $616_3$ used for precharging, and an NMOS transistor 617. Thus, the second-stage priority circuit is similar to the priority circuit of Embodiment 1 shown in FIG. 1 but is different in including no inverter on the input side.

The first-stage priority circuit and the second-stage priority circuit are connected to each other through four two-input OR circuits $608_0$, $608_1$, $608_2$ and $608_3$. Specifically, potentials on nodes on the output side of the inverters $602_0$, $602_1$, $602_2$ and $602_3$ and the corresponding outputs OUT0, OUT1, OUT2 and OUT3 of the respective priority circuit elements of the first-stage priority circuit are respectively input to the OR circuits $608_0$, $608_1$, $608_2$ and $608_3$, so that outputs MIN0, MIN1, MIN2 and MIN3, that is, logical sums of these inputs, can be input to the second-stage priority circuit. Owing to these OR circuits, the output signals MIN0, MIN1, MIN2 and MIN3 in which a relevant signal input as a H-level signal to and output as a L-level signal from the first-stage priority circuit, namely, the relevant signal determined to have the highest priority level through first priority processing, has been changed into a non-relevant signal are input as new input signals to the second-stage priority circuit for another priority processing. At this point, the precharge enable signal ENABLE is input to the gates of the NMOS transistors 607 and 617 and the PMOS transistors 606$_0$ through 606$_3$ and 616$_1$ through 616$_3$. The input precharge enable signal ENABLE exclusively controls these NMOS and PMOS transistors in the same manner as in the priority circuit of Embodiment 1 or 2.

Owing to the aforementioned configuration, the priority circuit 600 of this embodiment receiving the four input signals IN0, IN1, IN2 and IN3 performs the first priority processing by using the first-stage priority circuit, so as to output, to the output terminal HIT, a signal indicating whether or not the input signals include a relevant signal and to output the result of the priority processing as the output signals OUT0, OUT1, OUT2 and OUT3. Furthermore, in response to these output signals, the second-stage priority circuit performs the second priority processing on the new input signals in which the relevant signal of the first priority processing has been changed into a non-relevant signal, so as to output, to an output terminal MULTIHIT, a signal indicating whether or not the input signals include a relevant signal of the second priority processing and to output the result of the second priority processing as output signals MOUT0, MOUT1, MOUT2 and MOUT3.

Now, the operation of the priority circuit 600 of this embodiment will be described by exemplifying a case where the input signals IN0, IN1, IN2 and IN3 are respectively at L, H, L and H level.

When these input signals are input, the output signals OUT0, OUT1, OUT2, OUT3 and HIT of the first-stage priority circuit are respectively at L, H, L, L and H level as described in Embodiment 1. In this case, the output signals MIN0, MIN1, MIN2 and MIN3 of the OR circuits 608$_0$, 608$_1$, 608$_2$ and 608$_3$ that respectively receive, as the inputs, these outputs and the outputs of the inverters 602$_0$, 602$_1$, 602$_2$ and 602$_3$ are respectively at H, H, H and L level. In this embodiment, these output signals MIN0 through MIN3 are input to the second-stage priority circuit for the second priority processing. Accordingly, as a result of the priority processing performed by the second-stage priority circuit on the output signals MIN0 through MIN3, the output signals MOUT0, MOUT1, MOUT2, MOUT3 and MULTIHIT respectively at L, L, L, H and H level are obtained. At this point, since the output signals from the output terminals HIT and MULTIHIT are at H level and the output signals from the output terminals OUT1 and MOUT3 are at H level, it is understood through the processing of one cycle that the input signals IN0 through IN3 include two H-level signals and that the H-level signal with the highest priority level is the input signal IN1 and the H-level signal with the second highest priority level is the input signal IN3.

Figure 7:
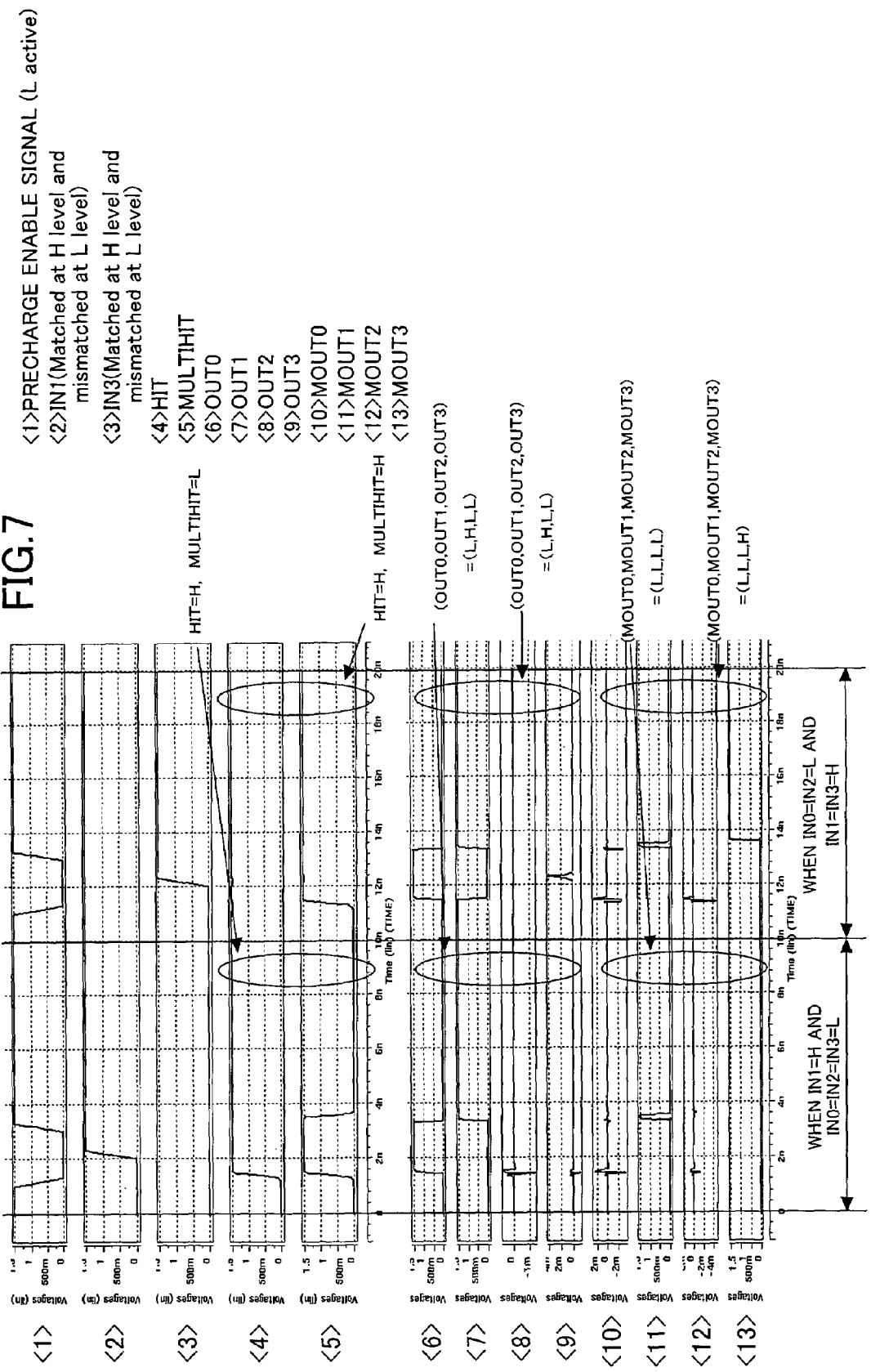
FIG. 7 is a graph for showing a result of simulation performed in the priority circuit of Embodiment 3.
Figure 8:
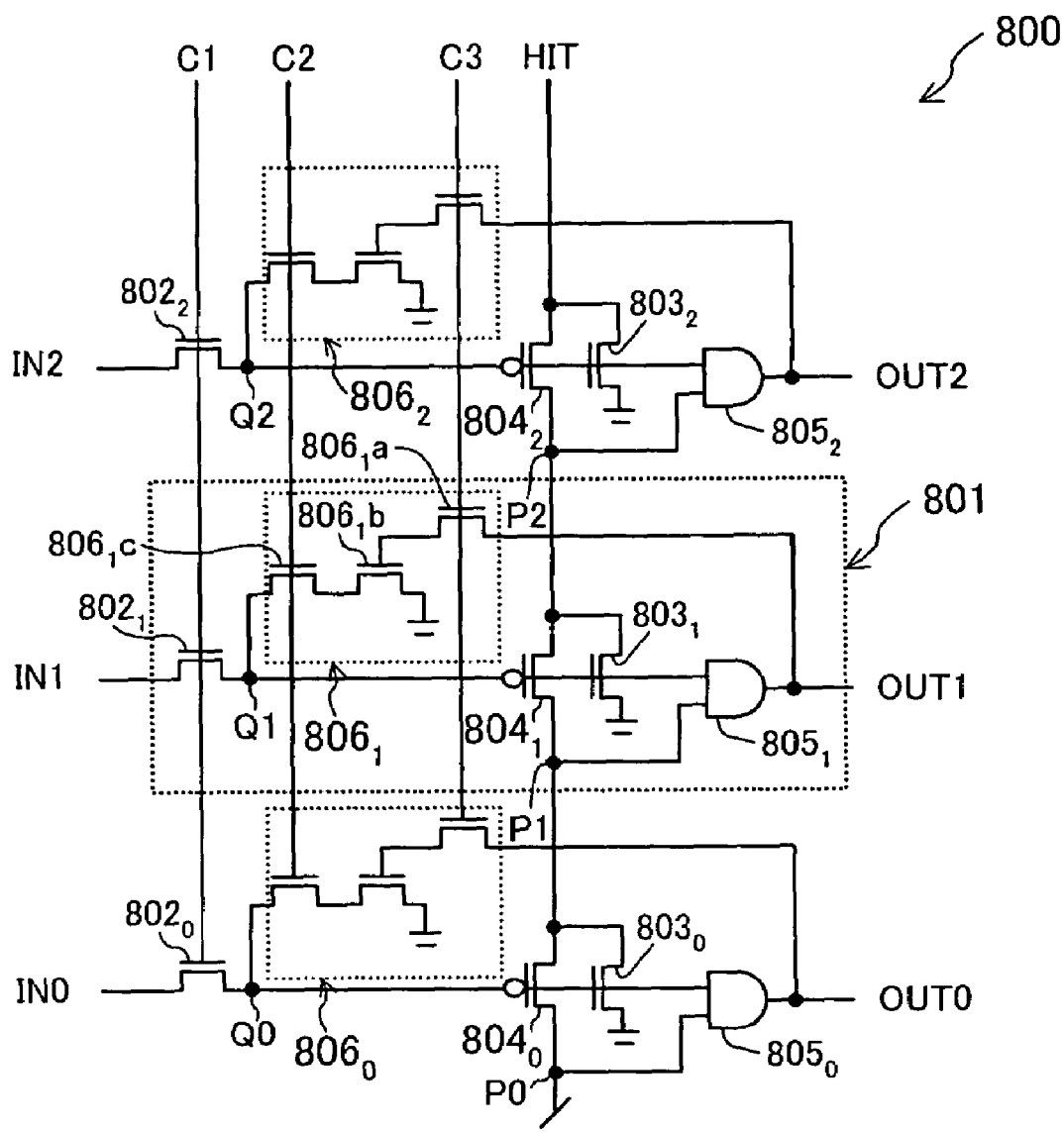
FIG. 8 is a diagram for showing the configuration of a conventional priority circuit.
Figure 9:
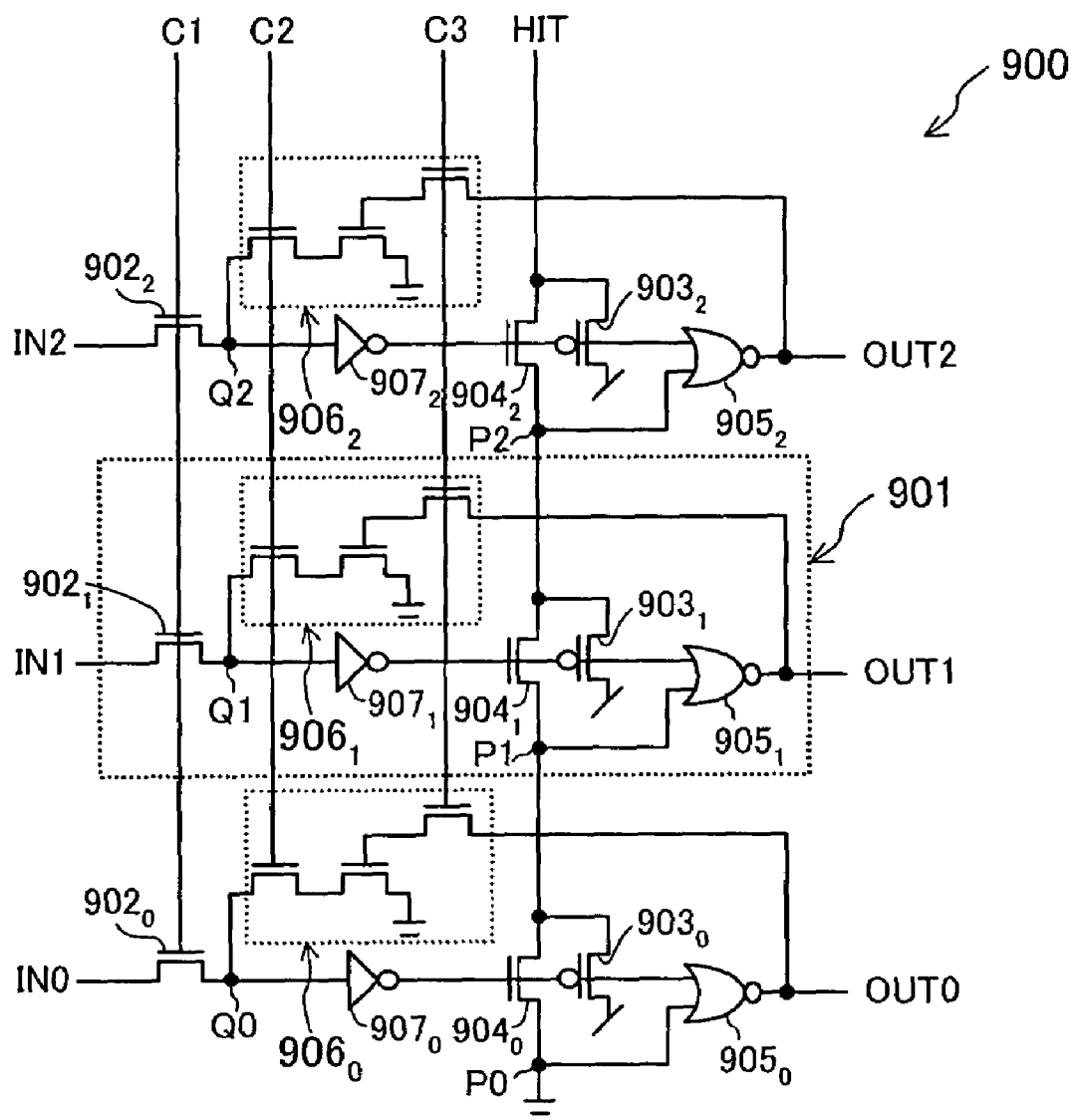
FIG. 9 is a diagram for showing the configuration of another conventional priority circuit.
Figure 10:
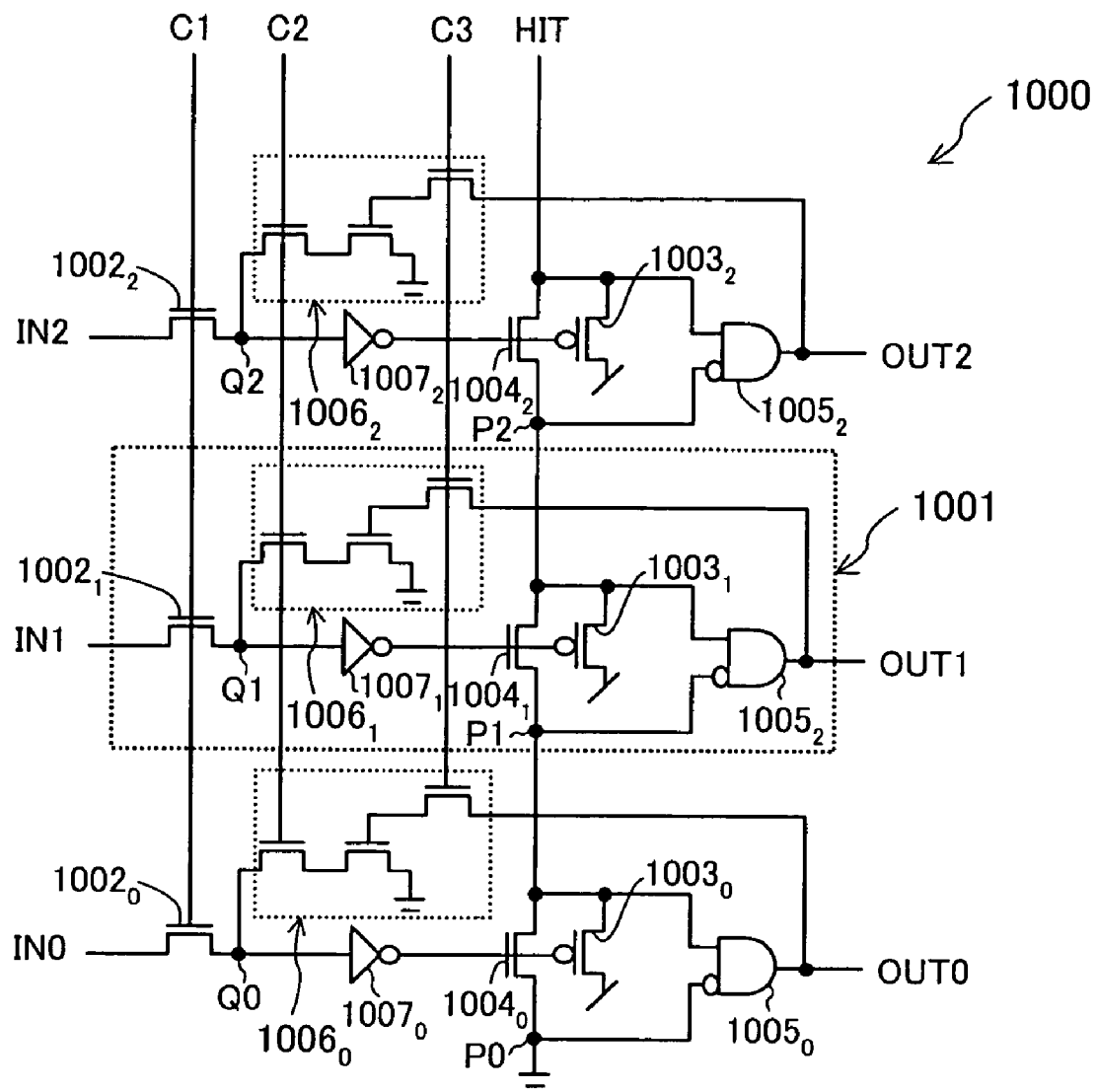
FIG. 10 is a diagram for showing the configuration of still another conventional priority circuit.

FIG. 7 shows the result of simulation performed in the priority circuit of this embodiment. In FIG. 7, in a period corresponding to time of 0 through 10 ns, the input signals IN0, IN1, IN2 and IN3 are respectively at L, H, L and L level, and in a period corresponding to time of 10 through 20 ns, the input signals IN0, IN1, IN2 and IN3 are respectively at L, H, L and H level. Waveforms <1>, <2>, <3> and <4> respectively correspond to the precharge enable signal, the input signal IN1, the input signal IN3 and the output signal HIT, whereas the precharge enable signal is an L active signal and the input signals IN1 and IN3 are determined to be matched when they are at H level and to be mismatched when they are at L level. Also, waveforms <6> through <9> respectively correspond to the output signals OUT0 through OUT3 of the first-stage priority circuit and waveforms <10> through <13> respectively correspond to the output signals MOUT0 through MOUT3 of the second-priority circuit.

In the period corresponding to the time of 0 through 10 ns, the precharge enable signal with the waveform <1> undergoes a L transition, namely, is activated, in the vicinity of time of 1 ns. Substantially simultaneously with the L activation of the precharge enable signal ENABLE, the output terminals HIT and MULTIHIT are precharged, so that the output signal HIT with the waveform <4> and the output signal MULTIHIT with the waveform <5> rise to H level. Under these conditions, the input signal IN1 with the waveform <2> is input, and after defining the value of the input signal IN1, the precharge enable signal ENABLE undergoes a H transition at time of 3 ns. At this point, since the input signal IN1 is at H level, the output signal HIT with the waveform <4> keeps the H level, which means that a H-level signal has been input to any of the input terminals of the first-stage priority circuit. However, since the input signal IN3 with the waveform <3> and the other input signals remain to be at L level, the output signal MULTIHIT with the waveform <5> rises, which means that a H-level signal is not input to the second-stage priority circuit.

With respect to the voltage waveforms of the output signals OUT0 through OUT3 obtained in the aforementioned processing, when the precharge enable signal ENABLE undergoes a H to L transition at time of 1 ns, the NMOS transistor 607 is turned off and the PMOS transistor 606$_0$ is turned on, and hence, the non-inverted input terminal of the AND circuit 605$_0$ receives a H-level signal and the grounded inverted input terminal thereof receives a L-level signal. Therefore, a H-level signal is output to the output terminal OUT0 and the voltage waveform <6> rises to H level at time of 1 ns. At this point, since the signals input to the inverted input terminals of the AND circuits 605$_1$, 605$_2$ and 605$_3$ of the other priority circuit elements are all at H level owing to the precharge operation, the output signals OUT1 through OUT3 are all at L level, namely, the voltage waveforms <7> through <9> keeps the L level.

Subsequently, after the input signal IN1 rises to H level during the L activation of the precharge enable signal ENABLE, when the precharge enable signal ENABLE undergoes a H transition at time of 3 ns, the PMOS transistors 606$_0$ through 606$_3$ used for precharging are turned off and the NMOS transistor 607 is turned on. At this point, since the input signal IN0 at L level is input, potentials on the source and the drain of the NMOS transistor 604$_0$ become L level, potential on the output signal OUT0 undergoes a H to L transition, and the voltage waveform <6> falls to L level after time of 3 ns. Simultaneously, potential on the source of the NMOS transistor 604$_1$ also becomes L level, and since the input signal IN1 is at H level, the PMOS transistor 603$_1$ is turned on. Therefore, the output signal OUT1 undergoes a L to H transition and the voltage waveform <7> rises from L to H level. Also, since the input signals IN2 and IN3 are at L level, H potential is transferred through the sources and the drains of the NMOS transistors 604$_2$ and 604$_3$, and both the output signals OUT2 and OUT3 remain to be at L level. Accordingly, the voltage waveforms <8> and <9> keep the L level.

As a result, the outputs of the inverters 602$_0$, 602$_1$, 602$_2$ and 602$_3$ are respectively at H, L, H and H level and the output signals OUT0, OUT1, OUT2 and OUT3 are respectively at L, H, L and L level. Therefore, the output signals of the OR circuits 608$_0$, 608$_1$, 608$_2$ and 608$_3$ are all at H level. Accordingly, the second-stage priority circuit is operated in the same manner as in a portion disposed after the inverters of the first-stage priority circuit, so as to output the output signals MOUT0, MOUT1, MOUT2, MOUT3 and MULTIHIT respectively at L, L, L, L and L level. Therefore, the voltage waveforms <10> through <13> all keep the L level.

Subsequently, an operation performed in the period corresponding to the time of 10 through 20 ns on the assumption that the input signals IN0, IN1, IN2 and IN3 are respectively at L, H, L and H level will be described.

In this case, since the input signal IN1 is still at H level, the voltage waveform <2> keeps the H level. However, since the input signal IN3 undergoes a H transition during time of 11 through 13 ns when the precharge enable signal ENABLE undergoes a L transition, the output signal MULTIHIT keeps the H level without falling to L level differently from the period corresponding to the time of 0 through 10 ns as shown by the waveform <5>. This will now be described in detail together with the waveforms <6> through <13>.

The voltage waveforms <6> through <8> obtained in the aforementioned processing in response to the voltage waveforms <1> through <5> after the L activation of the precharge enable signal ENABLE are the same as those obtained in the time of 0 through 10 ns and hence the description is omitted. In the period corresponding to the time of 10 through 20 ns, a H-level signal is input as the input signal IN3. However, the input to the AND circuit $605_3$ is unchanged. In other words, although the NMOS transistor $604_3$ is turned on so as to transfer the source potential of the NMOS transistor $604_3$ to the drain thereof and to transfer the H potential to the both input terminals of the AND circuit $605_3$ in the period corresponding to the time of 0 through 10 ns, the PMOS transistor $606_3$ is turned on in accordance with an inverted signal at L level of the input signal IN3 so as to input the same H potential to the both input terminals of the AND circuit $605_3$ in the period corresponding to the time of 10 through 20 ns. Accordingly, in both the periods, the output signal OUT3 is at L level. However, the inverter $602_3$ outputs a L-level signal, and hence, the OR circuit $608_3$ receiving L-level signals as its two inputs outputs a L-level signal. Accordingly, the PMOS transistor $613_3$ of the second-stage priority circuit is turned on, so as to output a H-level signal from the output terminal MULTIHIT. This appears on the waveform <5>. Specifically, even after the precharge enable signal ENABLE undergoes a H transition and the priority circuit enters the operational mode, the waveform <5> keeps the H level, which means that a plurality of H-level signals have been input to the priority circuit. Furthermore, as described above, the input signals MIN0, MIN1, MIN2 and MIN3 respectively at H, H, H and L level are input to the second-stage priority circuit, so as to output the output signals MOUT0, MOUT1, MOUT2, MOUT3 and MULTIHIT respectively at L, L, L, H and H level through the similar operation to that of the first-stage priority circuit. This appears on the voltage waveform <13>, and specifically, it rises at time of 13.6 ns.

Thus, owing to the aforementioned configuration, the priority circuit of this embodiment performs two priority processing in one cycle when two H-level signals are input.

According to the present invention, even when the number of input signals is increased in Embodiment 3, a similar operation is performed with the priority circuit elements 601 additionally provided. Furthermore, although the priority circuit of Embodiment 3 uses, as each of the first-stage and second-stage priority circuits, the priority circuit of Embodiment 1, a higher operation speed can be attained by using the priority circuit of Embodiment 2.

What is claimed is:

1. A priority circuit that receives m (wherein m is an integer of two or more) binary input signals, comprising:
    m priority circuit elements each including an NMOS transistor and HIT detecting means, an ith (wherein i is an integer not more than 1 and not less than m) priority circuit element that receives an ith binary input signal out of said m binary input signals and a (i+1)th priority circuit element with priority level lower by one than said ith priority circuit element being serially connected to each other via an ith propagating signal node for connecting an ith NMOS transistor and a (i+1)th NMOS transistor respectively included in said ith and (i+1)th priority circuit elements,
    wherein when said ith binary input signal is a relevant signal with a given value, potential on said ith propagating node is set to given high potential by ith HIT detecting means included in said ith priority circuit element, and when said ith binary input signal is a non-relevant signal, said ith NMOS transistor transfers potential on a (i−1)th propagating signal node to said ith propagating signal node for successively propagating a hit detection result to an mth propagating signal node, and in the case where said m binary input signals include one or more relevant signals, a given detection signal is output to a HIT output terminal connected to said mth propagating signal node, and for outputting an address of a relevant signal with the highest priority level, a signal different from signals output from the other priority circuit elements is output from a priority circuit element corresponding to a portion where said relevant signal with the highest priority level, out of said input relevant signals, defined on the basis of a given priority rule has been input,
    said priority circuit further comprising:
    priority circuit controlling means that is inserted between a 0th propagating signal node and given low potential and controls connection/disconnection between said 0th propagating signal node and said given low potential in response to a given control signal; and
    precharging means that is included in said ith priority circuit element and precharges, to given high potential, potential on said ith propagating signal node in accordance with said given control signal when said priority circuit is in a non-operational state.

2. The priority circuit of claim 1,
    wherein ith precharging means includes a PMOS transistor, which is connected to given high potential at a source thereof and connected to said ith propagating signal node at a drain thereof and is controlled in accordance with a signal input to a gate thereof.

3. The priority circuit of claim 1,
    wherein said priority circuit controlling means includes an NMOS transistor, and
    said NMOS transistor is inserted between said priority circuit and given low potential for controlling connection/disconnection between said priority circuit and said given low potential in accordance with a signal input to a gate thereof.

4. The priority circuit of claim 1, 2 or 3, further comprising:
    a bypass circuit connected between said ith propagating signal node and a (i+n) (wherein n is an integer of one or more) propagating signal node for bypassing at least one priority circuit element disposed therebetween, for bypassing, in response to a given bypass control signal, said at least one priority circuit element by short-circuiting said ith and said (i+n)th propagating signal nodes; and a bypass control circuit for inputting said bypass control signal to said bypass circuit, wherein when a relevant signal is input to none of (i+1)th through (i+n)th input terminals, said bypass control circuit inputs said bypass control signal to said bypass circuit.

5. The priority circuit of claim 1, 2 or 3, further comprising:

at least one additional priority circuit, serially connected at a second stage, for further performing priority processing on the basis of a result of priority processing having been performed on said m binary input signals in accordance with said given priority rule, in such a manner that the priority processing is simultaneously performed a given number of times on a plurality of relevant signals included in said m binary input signals, wherein said additional priority circuit serially connected at the second stage performs the priority processing on m new input signals in which a signal output as a relevant signal from said priority circuit disposed at a first stage has been changed into a non-relevant signal.

* * * * *